United States Patent
Cobb

(10) Patent No.: US 8,078,585 B2
(45) Date of Patent: Dec. 13, 2011

(54) REACTIVE FILE RECOVERY BASED ON FILE NAMING AND ACCESS INFORMATION

(75) Inventor: Daniel S. Cobb, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 118 days.

(21) Appl. No.: 11/427,584

(22) Filed: Jun. 29, 2006

(65) Prior Publication Data

US 2008/0005198 A1     Jan. 3, 2008

(51) Int. Cl.
  G06F 7/00     (2006.01)
  G06F 17/00    (2006.01)
(52) U.S. Cl. .................................... 707/674; 707/685
(58) Field of Classification Search ................ None
  See application file for complete search history.

(56) References Cited

U.S. PATENT DOCUMENTS

| | | | | |
|---|---|---|---|---|
| 6,084,825 A * | 7/2000 | Poggiagliolmi | | 367/30 |
| 6,618,818 B1 * | 9/2003 | Wahl et al. | | 714/6 |
| 6,671,705 B1 * | 12/2003 | Duprey et al. | | 1/1 |
| 6,823,349 B1 * | 11/2004 | Taylor et al. | | 707/204 |
| 2002/0035559 A1 * | 3/2002 | Crowe et al. | | 707/2 |
| 2003/0097443 A1 | 5/2003 | Gillett | | |
| 2005/0066118 A1 * | 3/2005 | Perry et al. | | 711/112 |
| 2005/0182910 A1 * | 8/2005 | Stager et al. | | 711/162 |
| 2005/0262097 A1 * | 11/2005 | Sim-Tang et al. | | 707/10 |
| 2007/0136397 A1 * | 6/2007 | Pragada et al. | | 707/204 |
| 2007/0294274 A1 * | 12/2007 | Kano | | 707/101 |

FOREIGN PATENT DOCUMENTS

WO     WO 03/046733 A1     6/2003

\* cited by examiner

*Primary Examiner* — Charles Rones
*Assistant Examiner* — Daniel Kuddus
(74) *Attorney, Agent, or Firm* — Workman Nydegger

(57) ABSTRACT

A method and system for restoring a version of the data object from a continuous data protection (CDP) engine without being required to access the CDP engine via a separate CDP-specific interface. A data access request includes a data identifier and a metadata portion and is sent to a system layer, where the data identifier identifies a current version of a data object, and the metadata portion identifies a prior version of the data object to be retrieved specifically from the CDP engine. The prior version of the data object is retrieved from the CDP engine and returned for efficiently restoring the prior version of the data object.

16 Claims, 3 Drawing Sheets

REACTIVE FILE RECOVERY BASED ON FILE NAMING AND ACCESS INFORMATION

BACKGROUND

1. The Field of the Invention

The present invention relates generally to the recovery of data from a continuous data protection engine. More specifically, the present invention relates to methods and systems for recovering data from a continuous data protection engine using an interface that is also employed for accessing data in a primary storage location.

2. The Relevant Technology

In this society where many personal and business interactions are data driven, data can become easily lost or corrupted due to events such as system failures, viruses, power outages, etc. Backing up data has become an important feature of computer networks because of this increasing dependence upon computers and networks to perform vital business and personal functions. The ability to easily, accurately and reliably access data is expected by anyone accessing a computer and/or network.

Backup and recovery of data is typically accomplished through the use of a data protection service that creates a backup copy of data and that recovers the data from the backup copy. As the amount of data continues to increase, and as the applications for creating data become more complex, backing up and recovering the data becomes more challenging.

Continuous data protection (CDP) is one example of a data protection service that is increasingly being used to protect complex applications. A CDP-based solution captures changes made to the application being protected to a CDP engine. Typically, a CDP specific interface is provided for accessing data stored within the CDP engine that is separate from the interface used for accessing data stored in the primary storage location. It would be advantageous to be able to access both the primary storage and the CDP engine using a single interface.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
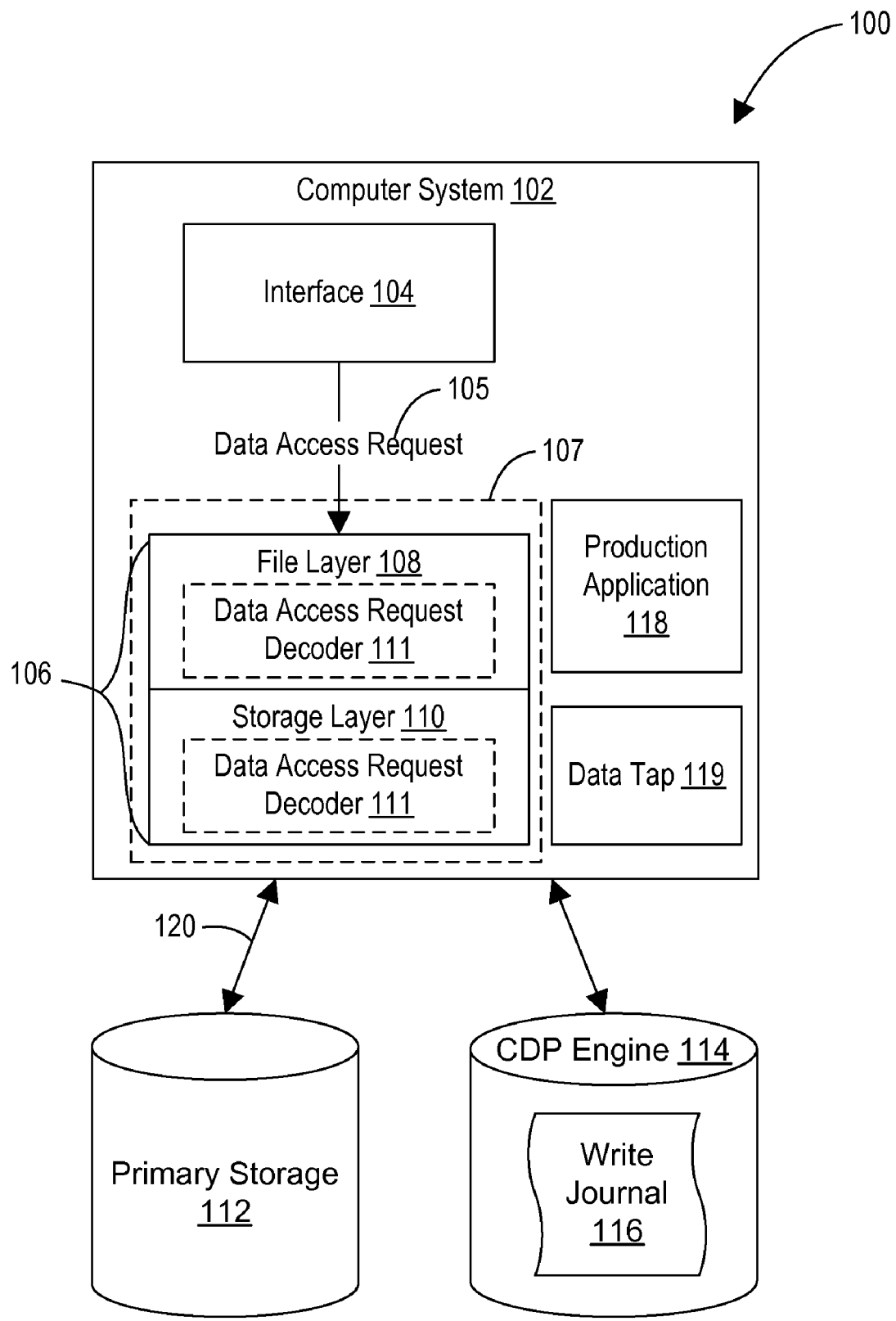
FIG. 1 illustrates a system that employs a single interface for accessing both the primary storage and the CDP engine.

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention Embodiments of the present invention provide for methods and systems for recovering data from a continuous data protection (CDP) engine without being required to access the CDP engine via a separate CDP-specific interface. Instead, the embodiments of the present invention allow a user to access data located within the CDP engine via an interface that may also be employed for accessing data in a primary storage location. When a request for a data object located within the CDP engine is made, a data access request is created having both a data identifier portion and a metadata portion. The data identifier identifies the data object to be recovered from the CDP engine and the metadata identifies a prior version of the data object.

Upon detecting that the data access request includes the metadata portion, a storage layer of the computer system determines the appropriate version of the data object that should be recovered from the CDP engine instead of recovering the most recent version of the data object from the primary storage location. Finally, the storage layer retrieves the appropriate version of the data object from the CDP engine and returns the data object to the original requester. The data object can then be used for a variety of purposes, including data recovery, data mirroring, creating a backup copy, remote storage, data mining, data consistency analysis, and the like. In an alternative embodiment, the metadata portion of the data access request is transparent in nature, such that the metadata can be passed through one or more system layers without being detected by the storage layer.

As used herein, the term "data" may include, but is not limited to, directories (e.g., volumes, file systems, and the like), user data, system data, applications, services, operating systems, instructions, and the like, that can be stored on one or more storage devices of a computer. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

For purposes of describing the present invention, the term "production application" will be used to describe the source of data that is being backed up. However, the technology disclosed herein facilitates the backup and recovery of all types of data and/or data structures, and can be beneficial to applications whose data is continually changing. Thus, although certain embodiments described herein will often refer to the backup of production applications, the technology described herein applies equally to the backup and recovery of any type of data, including files, databases, directories, volumes, file systems, servers, user data, system data, services, operating systems, computer executable instructions, computer settings, disks, and the like.

The term "data object" will be used herein to describe the data that is being backed up and/or recovered from the CDP engine and/or primary storage. The data object being recovered need not be the same type of data object being backed up by the CDP engine. For example, the CDP engine may be configured to continuously record every change made to an entire SQL server. The recovery, on the other hand, may consist of merely recovering a single file (or data object) from the CDP engine or primary storage.

Certain embodiments described herein will involve electronic communication between a client computer system (hereinafter referred to as a "client") requesting access to a network service at a server computer system (hereinafter referred to as a "server"). Accordingly, the client sends a request to the server for access to its system resources, wherein if the client is authorized and validated, the server responds with a response message providing the desired information. Of course, other messaging patterns between client and server are available, as are well known in the art.

As used herein, the term "user" may refer to a person operating the server (e.g., administrator). Alternatively, the term "user" may refer to a person at a client or management console. Users are able to initiate a request for mirroring, backup and/or restore, although it will be appreciated that the server may have additional functionalities not available to the client or management console.

Referring now to FIG. 1, a more detailed example of a system 100 is illustrated depicting a computer system 102 that utilizes a CDP engine 114 for performing backup and recovery operations. The computer system 102 includes an interface 104 for allowing a user to submit backup and/or data access requests 105. The computer system 102 may include any type of special-purpose computer or general-purpose computer, including a standalone computer, a server, a client computer, or a cluster of computers. Moreover, the principles of this disclosure may apply to various storage system architectures including, but not limited to, a storage area network (SAN), network attached storage (NAS), direct attached storage (DAS), and the like.

The computer system 102 further includes at least one production application 118, which contains and generates data that can be stored, mirrored, backed up, recovered, data mined, and the like. As noted above, the term "production application" is merely used by way of example to further illustrate the present invention, because complex applications whose data is continually being altered can benefit from the technology disclosed herein. However, other data on computer 102 that may also undergo storing, mirroring, backing up, data mining, and the like, which data may also include directories, volumes, file systems, servers, and other types of data described previously.

Furthermore, production application 118 may be comprised of multiple applications, located on multiple computers, volumes, directories, disks, or the like. By way of example only, production application 118 may include Oracle, SAP, Microsoft Exchange, and Microsoft SQL, PeopleSoft, Seibel, among other flexible enterprise resource planning (ERP) software applications and may operate on any of various different operating systems including, by way of example, Windows, Linux, NetWare, and UNIX platforms. System 100 may further include a primary storage 112. Primary storage 112 may be one of many storage mediums that are commonly employed in the art to store data. Examples include, but are not limited to, disk storage (e.g., optical disks, hard disks, RAIDs, floppy disks, zip disks, and the like), tape storage (e.g., magnetic tape, paper tape), solid state memory devices (e.g., flash memory, EEPROM, and the like), as well as any other storage medium currently known in the art or developed in the future.

The system 100 also includes a CDP engine 114. The CDP engine 114 is a data protection service configured to record a copy of all changes made to the data of the production application 118. The CDP engine 114 can provide fine granularities of restorable data objects, and can allow the data objects to be recovered as they appeared at any given point in time in the past. The CDP engine 114 may include a write journal 116 for maintaining a record of all I/O transactions from the time of the last mirroring operation. The CDP engine 114 can be accessed to provide a point-in-time recovery of the production application 118 or of any other data being protected by the CDP engine 114 where the data is located in the write journal 116. Exemplary systems for performing mirroring operations using CDP technology are described in further detail in U.S. patent application Ser. No. 11/381,336, filed May 2, 2006, entitled "Mirrored Storage Architecture Using Continuous Data Protection Techniques," which application is incorporated by reference in its entirety.

Computer system 102 further includes a data tap 119 that serves as an interface between the computer system 102 and the CDP engine 114. The data tap 119 consists of a software component configured to intercept all of the outputs that are sent from production application 118. Data tap 119 sends each of the changes occurring in production application 118 to CDP engine 114. Although the example of FIG. 1 portrays the data tap 119 as being included as part of the computer system 102, the data tap may alternatively be a component in the network connection 120 between the computer system 102 and the primary storage 112. Alternatively, the data tap 119 may be integrated with the primary storage 112, where the changes made to the primary storage are relayed to the CDP engine 114. Regardless of where the data tap 119 resides, the data tap intercepts all changes as they are being made to the primary storage 112 by the production application 118 and sends a copy of these changes to the write journal 116 of the CDP engine 114.

In a conventional environment, separate interfaces are typically provided for accessing data located within the primary storage location 112 and the CDP engine 114, whereas the present invention provides the ability to access both the primary storage 112 and the CDP engine 114 through a common interface 104. For example, conventionally, in order to access data located within the primary storage 112, a user typically submits a data access request via a first user interface, which may include any of a variety of file management interfaces. The data access request typically includes a file name and path, which may pass through one or more system layers. Typically, if any of the system layers receives a data access request that does not conform to an accepted file system protocol, an error is returned, such as "file not found." When a storage layer receives a conforming data access request, the storage layer retrieves the appropriate file from primary storage 112, and returns the file to the requesting location.

Further, in conventional systems, a second interface is conventionally provided specifically designed to allow a user to retrieve data stored in the CDP engine 114. The second interface displays the content of CDP engine 114 and allows a user to request that one or more data objects located within the CDP engine 114 be recovered as the data object appeared at a specific point in time. The request for the data object is converted into the format employed by the CDP engine 114. The CDP engine 114 retrieves the appropriate version of the data object, which can then be used for a variety of purposes, including remote storage, data mirroring, data mining, backup and recovery operations, data consistency analysis, and the like.

The present invention provides systems and methods for retrieving data from the primary storage 112 and CDP engine 114 without being required to use two separate C interfaces. Instead, a user may access either the current version of a data object from the primary storage 112 or a prior version of the data object from the CDP engine 114 through a common interface.

Turning back to FIG. 1, the computer system 102 includes user interface 104, as well as a storage system 107. The organization and functionality of the storage system 107 and system layers 106 may vary, and it is contemplated that the storage system 107 may be implemented using a variety of storage operating system architectures. The exemplary storage system 107, illustrated in FIG. 1, includes one or more system layers 106, which may include a file layer 108 and a storage layer 110. The computer system 102 may include other layers as well, such as a media access layer, a network protocol layer, a disk driver layer, and the like. The production application may access the primary storage 112 by way of either file layer 108 or alternatively, via the storage layer 110.

The file layer 108 receives data access requests 105 from the interface 104, maps the request for the data object to the location of the requested data object, and generates the necessary commands for retrieving the requested data from the appropriate storage location. The file layer 108 passes the commands to the storage layer 110, which may cooperate with an operating system to access the requested information. The storage layer 110 implements a storage protocol, such as a disk storage protocol, for acquiring the requested data object from the storage location.

Data is typically transferred between the interface 104, the storage system 107, and potentially a client using the services of the computer system 102 using an accepted protocol, such as common Internet file system (CIFS), network file system (NFS), or another appropriate protocol as defined by the storage system 107.

Exemplary procedures for accessing data both in the primary storage 112 and in the CDP engine 114 using a common interface 104 will now be explained. The interface 104 may include a file management interface, such as a textual interface (e.g., command line interface, Unix shell, DOS shell, etc.), a graphical file browser (e.g., Windows Explorer, Macintosh Finder, etc.), and the like. Alternatively, the interface 104 may include a mechanism for communicating data to and from a client computer, wherein the clients may communicate with the interface 104 either directly or over a LAN or other network.

The interface 104 receives a request from a user or client that a data object stored in either the primary storage 112 or the CDP engine 114 be recovered. In one embodiment, the interface 104 provides the user or client with the ability to select whether the data object will be recovered from the primary storage 112 or from the CDP engine 114. If the user or client selects to recover the data object from the primary storage 112, the user or client identifies the data object to be recovered. If the user or client selects to recover the data object from the CDP engine 114, the user or client identifies both the data object to be recovered and the version of the data object to be recovered.

For example, in one embodiment, a user is provided with a display that includes all versions of the data object that exist within the CDP engine 114, and the user may select a particular version of the data object to be recovered. Alternatively, the user may request that the data object be recovered as it appeared at a particular point in time in the past, and the system 100 will translate this point in time request into the appropriate version of the data object that existed at the requested point in time.

If the user or client requests that a data object be recovered from the primary storage 112, the data access request 105 may consist of a data identifier, which may include, for example, a file name and location path. The data access request 105 is received by the file layer 108, and if the data access request 105 conforms to the storage system protocol, the file layer 108 generates the appropriate command(s) to retrieve the requested data from the primary storage 112 and communicates the commands to the storage layer 110.

If the user or client requests that a data object be recovered from the CDP engine 114, the data access request 105 includes a data identifier portion for identifying a data object being requested and a metadata portion identifying the prior version of the data object to be recovered from the CDP engine 114. The two portions of the data access request 105 are pictorially depicted in FIG. 2, as will be discussed in further detail below.

In one embodiment, the metadata portion of the data access request 105 is encoded in a transparent manner, such that the metadata portion passes transparently through one or more system layers 106 prior to reaching the storage layer 110. As discussed above, the data access request 105 may pass through one or more layers, such as the file layer 108, prior to reaching the storage layer 110. When passing through the system layers 106 of the system computer 102, it is possible that the data access request 105 will be rejected due to non-compliance with the file system protocol employed by the system layers 106. In particular, the file system protocol employed by the file layer 108 may expect to receive data access requests containing only the data identifier portion, and will reject data access requests 105 containing the metadata portion. Therefore, in one embodiment, the metadata portion of the data access request 105 is configured so that it can be passed transparently through at least one system layer 106, such as the file layer 108, prior to reaching the storage layer 110. Further, the data identifier portion of the data access request 105 may be encoded in a manner that allows the data identifier portion to pass through the file layer 108 and be recognized as a normal request for data located within the primary storage 112 without being rejected for noncompliance with the protocol employed by the file layer 108.

As previously described, the storage layer 110 is conventionally configured to a receive a data identifier which identifies a data object, such as a file, to be accessed in the primary storage 112. However, in one embodiment of the present invention, a data access request decoder 111 may also be included within the storage layer 110. In another embodiment, the data access request decoder 111 is included within the file layer 108. The data access request decoder 111 receives the data access request 105 and determines if the data access request includes the metadata portion in addition to the data identifier. If the data access request decoder 111 determines that the data access request 105 consists solely of the data identifier, the storage layer 110 maps the request received from the file layer 108 to the appropriate location in primary storage 112, accesses the requested data from the primary storage 112, and returns the data to the requesting location.

However, if the data access request decoder 111 determines that the data access request 105 also includes a metadata portion, the storage layer 110 is notified that the data object should be recovered from the CDP engine 114 instead of from the primary storage location 112. Therefore, the storage layer 110 and/or file layer 108 sends the appropriate commands to the CDP engine 114, in accordance with a predefined CDP protocol, such that the requested version of the data object can be retrieved. For example, the appropriate layer 108 and/or 110 may provide the CDP engine 114 with the data identifier to identify the data object and a point in time to identify the version of the data object being recovered. The storage layer 110 then returns the retrieved prior version of the data object. The data object can then be used by the client or user for a variety of purposes, including data recovery, data mirroring, creating a backup copy, remote storage, data mining, data consistency analysis, and the like. While interface 104 is shown as located on computer system 102, where computer system 102 is a client communicating with a server, components of interface 104 and/or storage system 107 may exist on the sever and be accessible by a user on the server.

Figure 2:
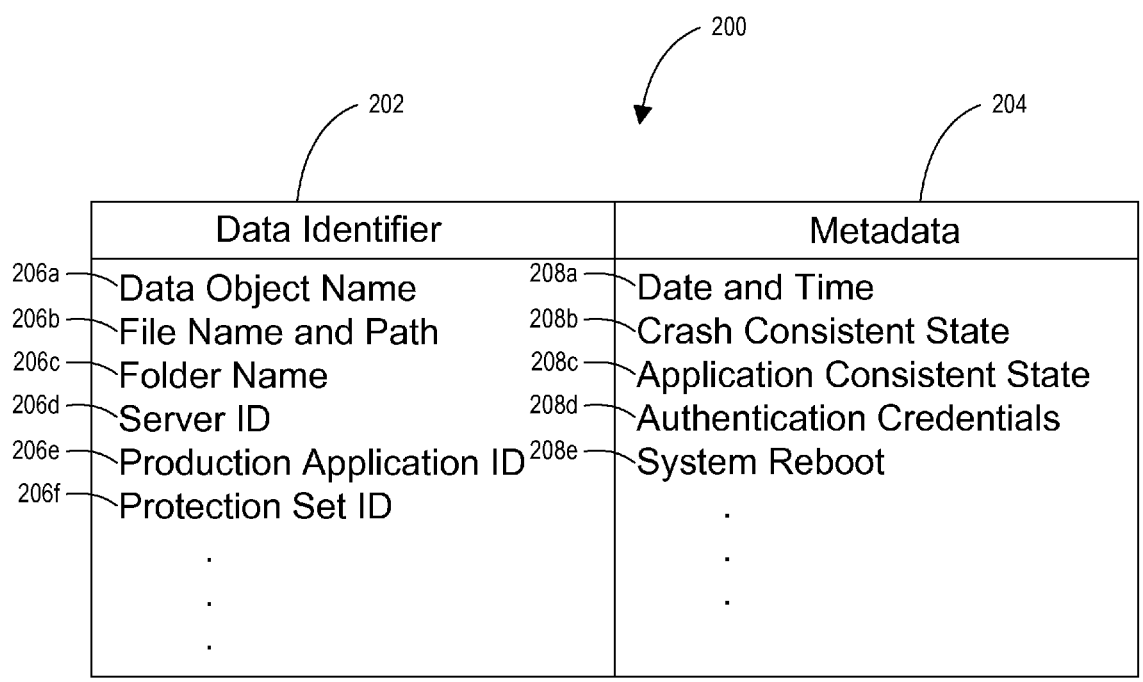
FIG. 2 illustrates the various types of data that may be included within a data access request.

FIG. 2 illustrates a data structure 200 of an exemplary data access request 105, including a data identifier portion 202 and a metadata portion 204. The data identifier portion 202 identifies the data object to be recovered. The data object identified by the data identifier may include a file, a database, a folder, a production application, an operating system, a computer setting, a system image, a disk image, a protection set and computer executable instructions, and the like.

The data identifier portion 202 may use any means of identifying the data object to be recovered. For example, the data identifier portion 202 may include, but is not limited to, the name of the data object 206a, the file name and path 206b, the name of a folder or directory 206c, an identifier 206d for a server, an identifier 206e for a production application, an identifier 206f for a protection set, combinations thereof, and the like. A protection set is a set of one or more data volumes being protected using CDP technology. As described above, the data identifier portion 202 is used by the storage layer 110 and the CDP engine 114 to identify the data object to be recovered.

The metadata portion 204 of the data access request 205 may identify the prior version of the data object in various ways. For example, the metadata portion 204 may include the point in time at which to restore the identified data object. For instance, the metadata portion 204 of the data access request 105 may include the date and time 208a, meaning that the CDP engine 114 will return the identified data object as it appeared at that date and time.

Additionally, the metadata portion 204 may include instruction 208b that the data object identified by the data identifier 202 be recovered in a crash consistent state. When an application is backed up at a point in time when the application is not in a consistent state, the backup is said to be in a "crash consistent state", i.e., in the same state it would have been had the system crashed and recovered (e.g., a loss of power) at the time of the backup operation. Therefore, when the metadata portion 204 provides that the data object should be recovered in a crash-consistent state, the CDP engine 114 may return, for example, the last version of the data object that existed prior to a system crash.

Alternatively, the metadata portion 204 may also include an instruction 208c that the data object identified by the data identifier 202 be recovered in an application consistent state. When an application is backed up at a point in time when the entire application is in a consistent state, the backup is said to be in an "application consistent state." One technique used to obtain an application consistent state is to quiesce the application prior to a backup operation (i.e., temporary enter an inactive state). By way of example, an application is quiesced after it has completed any operation necessary to achieve consistency. Therefore, when the metadata portion 204 provides that the data object should be recovered in an application consistent state, the CDP engine 114 may return the most recent version of the data object that is in an application consistent state.

In addition, the metadata portion 204 may include authentication credentials 208d. In some embodiments, authentication credentials 208d must be provided prior to gaining access to the CDP engine 114. Therefore, by including the authentication credentials 208d within the metadata portion 204, a user or client may access a version of the data object within the CDP engine 114 without being required to provide the authentication credentials via a separate interface 120.

The metadata portion 204 may also include an instruction 208e that the data object identified by the data identifier 202 be recovered as it appeared during a reboot operation of the computer system 102.

The exemplary information for including in a data access request 105 illustrated in FIG. 2 are provided by way of illustration, and not limitation. The data identifier portion 202 of the data access request 105 may include other means for identifying a data object to be recovered, and the metadata portion 204 of the data access request 105 may include other means for identifying a version of the data object to be recovered, in addition to those listed in data structure 200.

Figure 3:
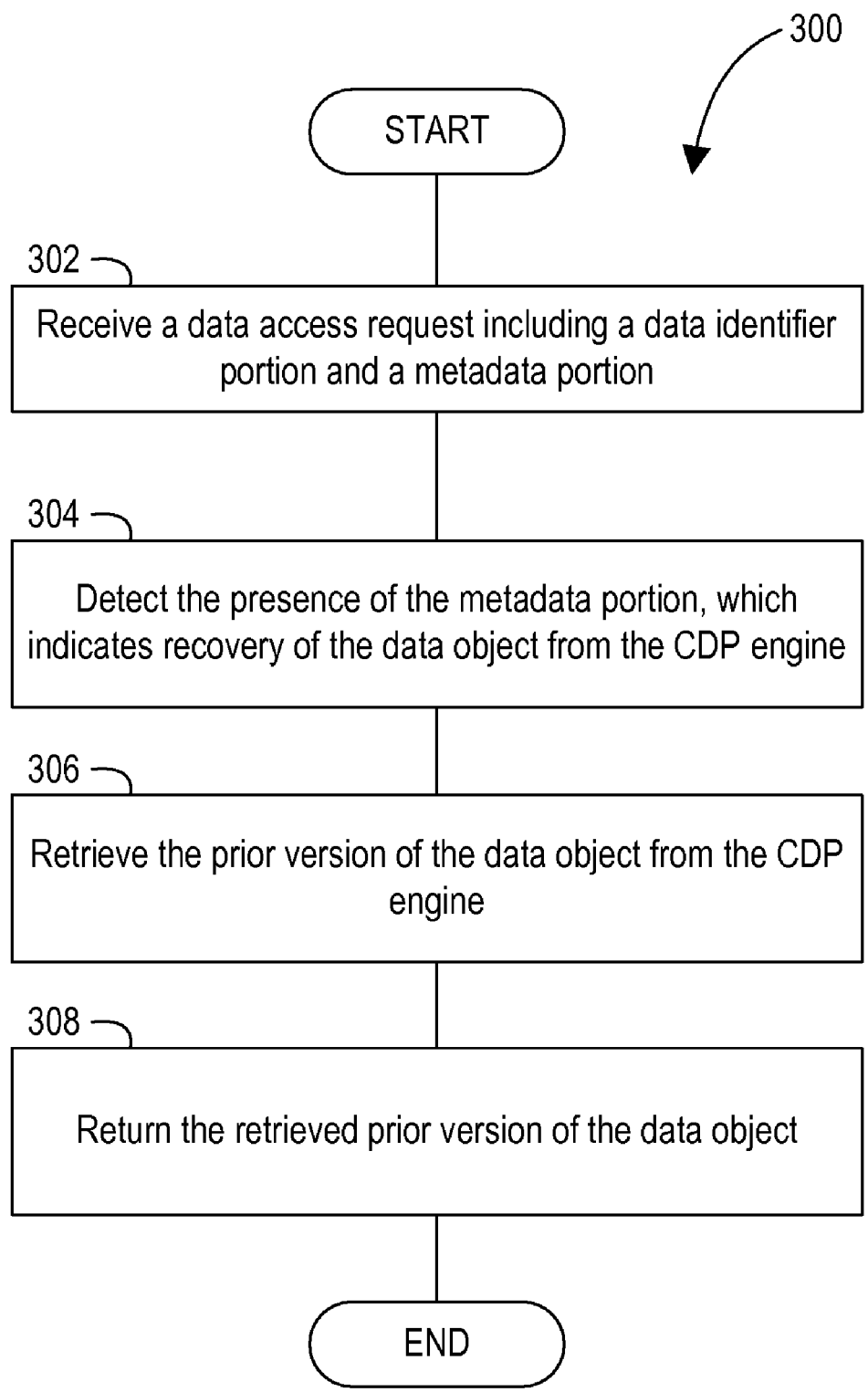
FIG. 3 illustrates a method for restoring a version of a data object from the CDP engine without being required to access the CDP engine via a separate CDP-specific interface.

Referring now to FIG. 3, a method 300 of restoring a version of the data object from the CDP engine 114 without being required to access a separate CDP-specific interface is illustrated. The method 300 may be practiced, for example, in a computing system that supports performing backup operations that utilize a CDP engine configured to save multiple versions of a data object. The method 300 includes, at 302, receiving a data access request 105 which includes a data identifier portion 202 and a metadata portion 204. The data identifier portion 202 is configured to identify a data object to be recovered and the metadata portion 204 is configured to identify a prior version of the data object. The data access request 105 is received at a storage layer, such as a system layer that is typically configured to access a current version of the data object identified by the data identifier from a primary storage location.

As described above, various layers of a computer system, such as a file layer, may require that data access requests conform to a predefined layer protocol. Any unexpected data, such as the metadata portion 204, may cause one or more layers of the system to return an error, such as "file not found." Therefore, in one embodiment, the metadata portion 204 of the data access request 105 may be configured to be passed transparently through at least one system layer before reaching the storage layer. For example, the metadata portion 204 of the data access request 105 may be encrypted so that the metadata portion of the data access request passes transparently through the layers of the system and is not rejected by the layers for including illegal syntax.

Furthermore, in one embodiment, the data identifier portion 202 of the data access request 105 may be configured according to a protocol employed by the system layers such that the data identifier portion 202 may pass through the layers of the system without being rejected for containing illegal syntax or other errors for nonconformity.

At 304, the method 300 further includes detecting the presence of the metadata portion 204 within the data access request 105. Detecting the metadata portion 204 serves as a notification to the storage layer that the data object should be recovered from the CDP engine instead of from the primary storage location.

At 306, the method 300 also includes retrieving the prior version of the data object from the CDP engine. At 308, the method 300 further includes returning the retrieved prior version of the data object. Once the prior version of the data object has been recovered, the recovered data object may be used for a variety of purposes, including data recovery, data mirroring, creating a backup copy, remote storage, data mining, data consistency analysis, and the like.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that supports performing backup operations using a continuous data protection (CDP) engine configured to save multiple versions of a data object, a method for restoring a version of a data object from the CDP engine without being required to access the CDP engine via a separate CDP-specific interface, the method comprising:
   presenting a single user interface that allows both (i) data objects to be retrieved from a primary storage device and (ii) prior versions of the data objects to be retrieved from the CDP engine that includes storage devices, the CDP engine configured to continuously record changes made to the data objects, wherein the CDP engine allows prior versions of the data objects to be recovered at prior points in time;
   receiving input in the single user interface identifying a prior version of a data object from the user interface;
   generating a data access request comprising a data identifier for identifying the data object and metadata identifying the prior version of the data object, wherein the metadata identifies a previous point in time, and wherein the prior version of the data object identified by the metadata corresponds to the data object as the data object existed at the previous point in time;
   configuring the metadata in the data access request to be passed transparently through at least one system layer of the computing system before reaching a storage layer, wherein the data access request for the prior version of the data object is recognized as a normal request for data located in the primary storage device the at least one system layer of the computing system;
   receiving the data access request at the storage layer of the computing system;
   decoding the data access request by the storage layer to determine that the data access request includes the metadata in addition to the data identifier, wherein detection of the metadata by the storage layer of the computing system notifies the storage layer that the prior version of the data object is to be accessed from the CDP engine instead of from the primary storage device;
   retrieving the prior version of the data object from the CDP engine based on the presence of the metadata instead of from the primary storage device, wherein the storage layer sends commands to the CDP engine in accordance with a predefined CDP protocol to retrieve the prior version; and
   returning the retrieved prior version of the data object.

2. The method as recited in claim 1, wherein the data identifier is configured according to a file system protocol employed by at least one system layer before reaching the storage layer.

3. The method as recited in claim 2, wherein the metadata included in the data access request is not rejected by the at least one system layer for including illegal syntax.

4. The method as recited in claim 3, wherein the metadata is encrypted to allow the metadata to be passed transparently through the at least one system layer.

5. The method as recited in claim 3, wherein the at least one system layer includes one or more file layers.

6. The method as recited in claim 1, wherein the metadata identifies a point in time that the data object was in an application consistent state.

7. The method as recited in claim 1, wherein the data object includes at least one of a file, a database, a folder, a production application, an operating system, a computer setting, a system image, a disk image, a protection set, or computer executable instructions.

8. A computer implemented method for accessing a current version of a data object or restoring a previous version of the data object, the method comprising:
   presenting an interface on a display that allows a data access request to be received for both (i) a current version of the data object from a primary storage device and (ii) a prior version of the data object from a storage device of a continuous data protection (CDP) engine, the CDP engine configured to continuously record changes made to the data object, and configured to recover the prior version of the data object at prior points in time;
   receiving input identifying the prior version of the data object;
   generating the data access request by including a data identifier and metadata in the data access request, wherein the metadata identifies a previous point in time, and wherein the prior version of the data object identified by the metadata corresponds to the data object as the data object existed at the previous point in time;
   passing the data access request through at least one system layer of the computer system, wherein the data access request is recognized as a normal request for data located in the primary storage device;
   receiving the data identifier in the data request for identifying the data object to be recovered from the CDP engine in the data request, the data identifier being configured in a protocol employed by one or more layers of a computer system;

detecting a presence of the metadata in the data request in a storage layer included in the one or more layers, wherein the metadata notifies the storage layer of the computer system that the prior version of the data object is to be accessed from the CDP engine instead of from the primary storage, wherein the computer system sends commands to the CDP engine in accordance with a predefined CDP protocol to retrieve the prior version;

identifying the prior version of the data object in the CDP engine to the storage layer based on the transparent metadata; and retrieving the prior version of the data object from the CDP engine instead of from the primary storage.

9. The computer implemented method as recited in claim 8, wherein the metadata included in the data access request is not rejected by the one or more layers of the computer system for including illegal syntax.

10. The computer implemented method as recited in claim 8, wherein the data identifier identifies the data object using at least one of:
   a name of the data object;
   a file name and path of the data object;
   a name of a folder or directory;
   an identifier for a server;
   an identifier for a production application;
   an identifier for a protection set; or
   combinations thereof.

11. The computer implemented method as recited in claim 8, wherein the metadata identifies a prior version of the data object using at least one of:
   a date and time;
   a point in time that the data object was in a crash consistent state;
   a point in time that the data object was in an application consistent state;
   authentication credentials;
   a point in time that the data object occurred during a reboot operation of the computer system; or
   combinations thereof.

12. The computer implemented method as recited in claim 8, wherein the data object includes at least one of a file, a database, a folder, a production application, an operating system, a computer setting, a system image, a disk image, a protection set, or computer executable instructions.

13. A computer program product configured to restore a prior version of a data object from a continuous data protection (CDP) engine without being required to access the CDP engine via a separate CDP-specific interface, the computer program product comprising:
   one or more tangible computer readable storage media having stored thereon computer executable instructions that, when executed by a processor:
      present a user interface on a display of the computing system, wherein the user interface provides the ability to select whether the data object will be recovered from a primary storage device or from the CDP engine, which includes one or more storage devices, the CDP engine configured to continuously record changes made to the data object and recover the prior version of the data object at multiple points in time;
      receive a data access request via the user interface for the prior version of the data object or for the data object stored in the primary storage device;
      pass the data access request such that the data access is recognized as a normal request for data located in the primary storage device when the data access request is for the prior version of the data object and when the data access request is for the data object stored in the primary storage device;
      decode the data access request to determine whether the data access request includes metadata, wherein the data access request includes a data identifier for identifying a current version of the data object when the data access request is for the data object stored in the primary storage device, wherein the data access request includes a data identifier for the prior version of the data object and the metadata configured to be transparent to at least one system layer of the computer system and identify the prior version of the data object when the data access request is for the prior version of the data object, wherein the transparent metadata identifies a previous point in time, and wherein the prior version of the data object identified by the metadata corresponds to the data object as the data object existed at the previous point in time when the data access request is for the prior version of the data object, wherein detection of the presence of the metadata notifies the system layer to access the prior version of the data object from the CDP engine instead of from the primary storage;
      retrieve the prior version of the data object from the CDP engine based on the presence of the transparent metadata instead of from the primary storage; and
      return the retrieved prior version of the data object.

14. The computer program product as recited in claim 13, wherein the transparent metadata identifies a point in time that the data object was in an application consistent state.

15. The computer program product as recited in claim 13, wherein the data object includes at least one of a file, a database, a folder, a production application, an operating system, a computer setting, a system image, a disk image, a protection set, or computer executable instructions.

16. The computer program product as recited in claim 13, wherein a system layer is further configured for accessing the current version of the data object from the primary storage location when the data access request only includes the data identifier and not the transparent metadata.

\* \* \* \* \*